Patented Sept. 28, 1943

2,330,579

UNITED STATES PATENT OFFICE 2,330,579

PROCESS OF HYDRATING TURPENTINE AND LIKE MATTERS

Torsten Hasselstrom, Savannah, Ga., assignor to G and A Laboratories, Inc., Savannah, Ga., a corporation of Georgia No Drawing. Application October 31, 1938
Serial No. 238,085

15 Claims. (Cl. 260—630)

This invention relates to a process of refining and hydrating pinene-containing materials and/or mixtures thereof.

Many processes are known by which turpentine may be hydrated such as, for example, mixing turpentine with dilute mineral acids. These prior processes suffer from the disadvantage that comparatively low yields of hydrated turpentine products are obtained, which represents a relatively high cost of such products.

It has been found that superior yields may be obtained, and a greater degree of refinement effected, by employing certain sulfonate substances during the course of the action. Such substances appear to act both as emulsifiers and as hydrating catalysts in controlling the course and degree of the reaction occurring. By employing pseudo-pimaric acid sulfonate, in crude or refined form, such as the form in which it is prepared in accordance with the processes set out in United States Letters Patent 2,121,032 and 2,121,033, hydration products of turpentine are obtained in exceptionally good yields.

Broadly speaking, the invention comprises the hydration of pinene-containing material, by the action of such sulfonates and a dilute mineral acid such as phosphoric acid, hydrochloric acid, nitric acid, but preferably sulfuric acid. The reaction progresses without external heating and substantially at room temperature, with substantially continuous agitation. Terpin hydrate separates as the upper layer, having the consistency of a semi-solid mass which can be separated off by filtering or like means, and the liquid lower layer or filtrate can then be agitated further for the formation of more terpin hydrate, repeating the procedure until no more terpin hydrate is separated. The residual liquid can then be employed as dilute mineral acid mixture for hydration of further pinene-containing material.

This semi-solid upper layer can be washed with water until it is practically free from mineral acids, and consists mainly of terpin hydrate, bi-cyclic terpenes, mono-cyclic terpenes, and hydrated terpenes commonly known to the art as pine oil. The washing operation normally results in a separation from the mixture with the wash liquor of a semi-solid upper layer which can be filtered in an appropriate manner to yield a solid material consisting of terpin hydrate, which may be further purified by washing with dilute alkali solution and water, and then re-crystallizing from a suitable solvent such as ethanol to produce chemically pure terpin hydrate. Further, the crude terpin hydrate may directly be used as a raw material for the making of alpha-terpeneol by processes known to the art. The liquid terpenes obtained after the separation of terpin hydrate, or the original crude semi-solid upper layer, may be subjected to distillation in steam or superheated steam, or otherwise to a fractional distillation, preferably with the prior addition of an alkali, an earth alkali, or a carbonate for neutralizing any catalyst and/or mineral acid present. The distillation results in a separation of bi-cyclic terpenes, mono-cyclic terpenes, and pine oil. The fractional distillation may be carried out at ordinary pressure, but it is preferred to employ a reduced pressure to avoid any decomposition of the materials.

The following examples will serve to illustrate the invention, but are not restrictive as to the details set out therein:

Example I

As an example of carrying out the process, 200 cc. of gum spirits of turpentine, 200 cc. of 25 percent sulfuric acid, and 25 g. of crude pseudo-pimaric acid sulfonate (prepared as in the aforesaid patents) were stirred at room temperature for 42 hours. The lower acid layer was then drawn off, and the upper layer (a semi-solid mass) was washed with water until entirely free from mineral acids, and then filtered, whereby was obtained about 98 g. of crude terpin hydrate. The filtrate comprised liquid terpenes which were agitated for an additional 24 hours, and upon similar separation a further yield of about 51 g. of crude terpin hydrate was obtained. The final liquid comprised about 86 g. of liquid terpenes.

Instead of gum spirits of turpentine, steam distilled wood turpentine, destructively distilled wood turpentine, crude sulfate turpentine, refined sulfate turpentine, or mixtures thereof may be employed.

The recovered mineral acids of the lower acid layer may be directly re-used for treating further amounts of turpentine, after adding further pseudopimaric acid to compensate for losses thereof arising from its inclusion in the upper layer.

A presently preferred way of practicing the invention thus is to agitate the mixture until a definite segregation of the semi-solid mass occurs and to separate the lower acid layer from this mass. The mass is then placed in a suction filter so that a liquid fraction is drawn off, consisting of bi-cyclic terpenes, mono-cyclic terpenes and pine oil. The mass remaining in the filter can then be washed with water as stated above, and preferably with water containing crude pseudopimaric acid sulfonate to compensate losses thereof: this wash liquor may be mixed with the liquid filtrate, and permitted to stand so that the water separates. This water is then drawn off, and the oily portions are then subjected to the further agitation, followed by a separation of further crude terpin hydrate, which is purified as above. This operation can be repeated a number of times until the remaining quantities of liquid are very small.

Further, it is practical to accomplish the initial separation in successive operations, as by agitating the original mixture of turpentine, mineral acid, and sulfonate until a limited quantity of the semi-solid mass is produced, then separating the liquid lower layer from the solid mass and continuing with further agitation of the liquid lower layer.

Example II

The liquid terpenes prepared in accordance with Example I were treated in the following manner:

400 g. of the material were mixed with 25 g. of calcium carbonate in finely divided form, whereby 341 g. of hydrated terpenes, bi-cyclic terpenes, and mono-cyclic terpenes were obtained. 219 g. of this recovered material were subjected to fractional distillation in vacuum, whereby the following fractions were obtained:

| Fraction | Pressure | B. P. | Density at 25° C. | Refractive index at 25° C. | Yield | Percent |
|---|---|---|---|---|---|---|
| | Mm. | | | | | |
| 1 | 28 | 64–68 | 0.8538 | 1.46304 | 68 | 21 |
| 2 | 28 | 68–75 | 0.8562 | 1.46424 | 22 | 10 |
| 3 | 28 | 75–80 | 0.8576 | 1.46652 | 18 | 8.2 |
| 4 | 28 | 80–85 | 0.8593 | 1.47046 | 18 | 8.2 |
| 5 | 28 | 85–90 | 0.8637 | 1.47616 | 19 | 8.6 |
| 6 | 28 | 90–95 | 0.8752 | 1.48007 | 6 | 2.5 |
| 7 | 7 | 85–105 | 0.9152 | 1.48007 | 11 | 5 |
| 8 | 7 | 105–107 | 0.9355 | 1.48056 | 42 | 19.5 |

The fractions 1–4 represent practically pure bi-cyclic terpenes; the fractions 5 and 6, monocyclic terpenes; and fractions 7 and 8, hydrated terpenes, commonly known to the art as pine oil.

Similar conversions can be effected by substituting for the pseudopimaric acid sulfonate as a catalyst and/or emulsifier, corresponding quantities of sulfonated rosin, sulfonated rosin oil, sulfonated abietenes, sulfonated resin acids, and/or mixtures of such catalysts. These materials as a group may be termed sulfonates of resin radicals.

In Example I above, the mineral acid was stated to be of 25 percent concentration. Similar results can be obtained at concentrations between 5 and 50 percent, but it is preferred to employ a concentration between 15 and 30 percent. The quantity of acid solution utilized will vary according to the concentration of the acid, in a manner understood in the art.

The bi-cyclic terpene fractions obtained may be usefully employed as a superior gum spirits of turpentine in paints and as solvents.

Among the products obtainable according to the aforesaid example is a composition of matter comprising pine oil and containing from 1 to 25 percent of the sulfonate material utilized as a catalyst for the reaction. This material is excellently adapted for employment as a dyeing vehicle and assistant for textiles, for effecting penetration of the dyestuffs into the textile. In particular, the liquid fraction obtained by filtering the semi-solid mass can be employed directly for this purpose, as it includes pine oil and pseudopimaric acid sulfonate, in the practice of Example I. Likewise, fractions 7 and 8 of Example II may have pseudopimaric acid sulfonate admixed therein in a percentage from a fraction of a percent up to, say, 25 percent, in preparing the composition for such purposes.

It is obvious that the invention is not limited to the specific examples given, but that it may be modified in many ways within the scope of the appended claims.

I claim:

1. A process of hydrating pinene-containing materials, which comprises mixing the material with dilute mineral acid and a substance selected from the group consisting of pseudopimaric acid sulfonate, sulfonated rosin, sulfonated rosin oils, sulfonated abietenes, and sulfonated resin acids, agitating, and withdrawing a semi-solid upper layer containing terpin hydrate.

2. A process of hydrating pinene-containing materials, which comprises mixing the material with dilute mineral acid and pseudopimaric acid sulfonate, agitating, and withdrawing a semi-solid upper layer containing terpin hydrate.

3. A process of hydrating pinene-containing materials, which comprises mixing the material with mineral acid of a concentration between five and fifty percent and with pseudopimaric acid sulfonate, agitating, and withdrawing a semi-solid upper layer containing terpin hydrate.

4. A process of hydrating pinene-containing materials, which comprises mixing the material with dilute sulfuric acid of a concentration from five to fifty percent and with a sulfonate of a resin radical, agitating until a semi-solid upper layer is formed, withdrawing the upper layer, and continuing the agitation of the liquid for obtaining a further quantity of semi-solid material as an upper layer thereon.

5. A process of hydrating pinene-containing materials, which comprises mixing the material with dilute mineral acid and a substance selected from the group consisting of pseudopimaric acid sulfonate, sulfonated rosin, sulfonated rosin oils, sulfonated abietenes, and sulfonated resin acids, agitating, withdrawing a semi-solid upper layer, washing the same and separating a solid and a liquid fraction, and subjecting the liquid fraction to distillation for producing separate fractions of cyclic terpenes and hydrated terpenes.

6. A process of making hydrated terpenes from pinene-containing materials, which comprises mixing the material with dilute mineral acid and a substance selected from the group consisting of pseudopimaric acid sulfonte, sulfonated rosin, sulfonated rosin oils, sulfonated abietenes, and sulfonated resin acids, agitating, withdrawing a semi-solid upper layer, separating said upper layer into a solid and a liquid component, and distilling the liquid component under reduced pressure and recovering a fraction having a boiling point between 85 and 107° C. at a pressure of 7 millimeters.

7. A process of refining turpentine, which comprises mixing the turpentine with dilute mineral acid and a substance selected from the group consisting of pseudopimaric acid sulfonate, sulfonated rosin, sulfonated rosin oils, sulfonated abietenes, and sulfonated resin acids, agitating, withdrawing a semi-solid upper layer and separating the same into a solid component and a liquid component, and fractionally distilling the liquid component and recovering the bi-cyclic terpene fraction boiling at 64 to 85° C. under a pressure of 28 millimeters.

8. A process of obtaining terpin hydrate from pinene-containing materials, which comprises mixing the material with dilute mineral acid and pseudopimaric acid sulfonate, agitating the mixture at room temperature, and withdrawing a semi-solid upper layer containing terpin hydrate.

9. A process of obtaining a solvent comprising bi-cyclic terpenes from pinene-containing materials, which comprises mixing the material with dilute mineral acid and pseudopimaric acid sulfonate, agitating the mixture at room temperature and withdrawing a semi-solid upper layer, separating said semi-solid upper layer into a solid component and a liquid component, and subjecting the liquid component to fractional distillation and thereby recovering a bi-cyclic terpene fraction boiling at 64 to 85° C. under a pressure of 28 millimeters.

10. A process of preparing terpin hydrate which comprises agitating turpentine with dilute mineral acid and a sulfonate of a resin radical until a semi-solid mass is formed, which separates upon standing as an upper layer, withdrawing the upper layer and subjecting it to filtration and washing to remove original materials and terpenes therefrom, dissolving the residual solid and crystallizing terpin hydrate therefrom.

11. A process of hydrating pinene-containing materials, which comprises mixing the material with sulfuric acid of a concentration between 15 and 30 percent and with pseudopimaric acid sulfonate, agitating, and withdrawing a semi-solid upper layer containing hydrated terpenes.

12. A process of preparing terpin hydrate from turpentine, which comprises mixing the turpentine with dilute mineral acid and a substance selected from the group consisting of pseudoprimaric acid sulfonate, sulfonated rosin, sulfonated rosin oils, sulfonated abietenes, and sulfonated resin acids, agitating, withdrawing a semi-solid upper layer, washing the same and separating into a solid and a liquid fraction, and separating terpin hydrate from the solid fraction.

13. A process of hydrating pinene-containing materials, which comprises mixing the material with dilute mineral acid and pseudopimaric acid sulfonate, the mineral acid having a concentration between 5 and 50 percent, agitating the mixture at room temperature, withdrawing a semi-solid upper layer and separating the same into a solid component and a liquid component, said solid component substantially consisting of terpin hydrate and said liquid component comprising pine oil.

14. The process of preparing terpin hydrate which comprises treating turpentine oil with dilute mineral acid selected from the group consisting of sulfuric, nitric and phosphoric acid in the presence of an emulsifying agent active in an acid medium.

15. A process of hydrating pinene-containing materials, which comprises mixing the material with dilute mineral acid and a substance selected from the group consisting of pseudopimaric acid sulfoniate, sulfonated rosin, sulfonated rosin oils, sulfonated abietenes, and sulfonated resin acids, agitating, withdrawing a semi-solid upper layer, washing the same and separating a solid and a liquid fraction, neutralizing residual mineral acid in the liquid fraction, and subjecting the neutralized liquid fraction to distillation for producing separate fractions of cyclic terpenes and hydrated terpenes.

TORSTEN HASSELSTROM.